United States Patent [19]

Maehara

[11] Patent Number: 4,922,961

[45] Date of Patent: May 8, 1990

[54] ELECTROMAGNETIC VALVE

[75] Inventor: Toshifumi Maehara, Saitama, Japan

[73] Assignees: Akebono Brake Industry Co., Ltd., Tokyo; Akebono Research and Development Centre, Ltd., Saitama, both of Japan

[21] Appl. No.: 391,238

[22] Filed: Aug. 9, 1989

[30] Foreign Application Priority Data

Sep. 5, 1988 [JP] Japan .................. 63-222029

[51] Int. Cl.⁵ .............................. F16K 31/02
[52] U.S. Cl. .................. 137/596.17; 251/129.21
[58] Field of Search ............ 251/129.07, 129.21; 137/196.17

[56] References Cited

U.S. PATENT DOCUMENTS 4,668,024  5/1987  Nakanishi et al. ......... 251/129.21 X
4,859,005  8/1989  Rey et al. .................. 137/596.17 X

FOREIGN PATENT DOCUMENTS 52776  4/1986  Japan .
82185  5/1986  Japan .

*Primary Examiner*—John Fox
*Attorney, Agent, or Firm*—Oliff & Berridge

[57] ABSTRACT

An electromagnetic valve used in a hydraulic-pressure brake device, etc. is disclosed. The electromagnetic valve is so designed that the movement of its plungers is not hindered by the working liquid. Cylindrical members are arranged between the casing of the electromagnetic valve and its plungers, defining a bypass passage between the respective outer peripheral surfaces of the cylindrical members and the inner peripheral surface of the casing. With this structure, most of the liquid flowing with the opening/closing movement of valve members operatively connected to the plungers is allowed to flow through the bypass passage, thus making it possible to provide an electromagnetic valve having a high control responsiveness, without enlarging the size of the plungers.

9 Claims, 3 Drawing Sheets

ELECTROMAGNETIC VALVE

BACKGROUND OF THE INVENTION

This invention relates to an electromagnetic valve, and in particular to an electromagnetic valve of the type used in a hydraulic control system.

Japanese Utility Model Laid-Open Nos. 61-82185 and 61-52776 disclose examples of conventional electromagnetic valves used in a hydraulic control system, which are shown in FIGS. 4 and 5, respectively.

The electromagnetic valve shown in FIG. 4 includes a casing 30 having in it sleeves 34 in which plungers 31 are slidably arranged, the plungers 31 being driven by means of solenoids 32 provided outside the casing 30. The plungers 31 are equipped with respective ball valves 33 which are adapted to abut against respective valve seats 35, thereby effecting a valve action.

In this type of electromagnetic valve, it is necessary to provide in the plungers 31 themselves or between the plungers 31 and the casing 30 a liquid-flow path allowing the working liquid to pass through the valve. In the example shown, bias springs 36 arranged between the respective plungers 31 and the sleeves 34 provide such a flow path.

In the electromagnetic valve shown in FIG. 5, which is of substantially the same type as the one shown in FIG. 4, the requisite flow path is provided by grooves 40 formed on the side surface of the plunger 31 as well as by a hole section at the center of the plunger 31.

The problem with these prior art structures is that the working liquid is allowed to flow over the side surface of the plunger as well as through the central section thereof, which adversely affects the movement of the plunger, thereby making unreliable the action of the plunger in response to control signals. In other words, these conventional electromagnetic valves lack in responsiveness. As a result, these valves must have quite a large size before they can provide an operational force which can overcome the resistance of the working liquid.

The movement of the plunger might be made smoother by enlarging the plunger side surface as well as the flow path at the center thereof, which would also help to prevent the working liquid from adversely affecting the plunger movement. However, this will inevitably involve an enlargement in the valve size before a sufficiently wide flow path can be secured.

SUMMARY OF THE INVENTION

This invention has been contrived with a view to eliminating the above-mentioned problems experienced in the prior art electromagnetic valves. It is accordingly an object of this invention to provide an electromagnetic valve in which there is no danger of the plunger movement being hindered by the flow of the working liquid, which provides a satisfactory responsiveness to control and smooth operation of the plunger itself, and which can be made relatively small.

In accordance with this invention, there is provided an electromagnetic valve comprising plungers, a casing, valve members operatively connected to the plungers and sealed in the casing, solenoids provided outside the casing and adapted to drive the plungers, a liquid-inlet/outlet port, cylindrical members provided between the casing and the plungers, a by-pass passage defined between the outer peripheral surfaces of these cylindrical members and the inner surface of the casing, the above-mentioned by-pass passage being open onto the above-mentioned valve members as well as onto the above-mentioned liquid-inlet/outlet port.

In the above-described structure, most of the liquid flowing with the opening/closing movement of the valve members is allowed to pass through the above-mentioned by-pass passage defined between the outer surfaces of the cylindrical members and the inner surface of the casing, thereby preventing the movement of the working liquid from directly acting on the plungers. As a result, there is no danger of the plunger movement being hindered, which provides a satisfactory control responsiveness and allows the valve to operate smoothly.

Furthermore, since the plungers have only to be equipped with flow passages large enough to allow them to move, the plunger size can be made smaller than in the prior art, thus making it possible to provide a smaller electromagnetic valve.

BRIEF DESCRIPTION OF THE DRAWINGS

FIGS. 1 to 3 show an electromagnetic valve in accordance with an embodiment of this invention, of which:

FIG. 1 is an overall sectional view of this electromagnetic valve;

FIG. 2 is a cross-sectional view of a plunger used in this electromagnetic valve; and FIG. 3 is a cross-sectional view of a cylindrical member used in this electromagnetic valve.

DESCRIPTION OF THE PREFERRED EMBODIMENT

An embodiment of this invention will now be described in detail.

Figure 1:
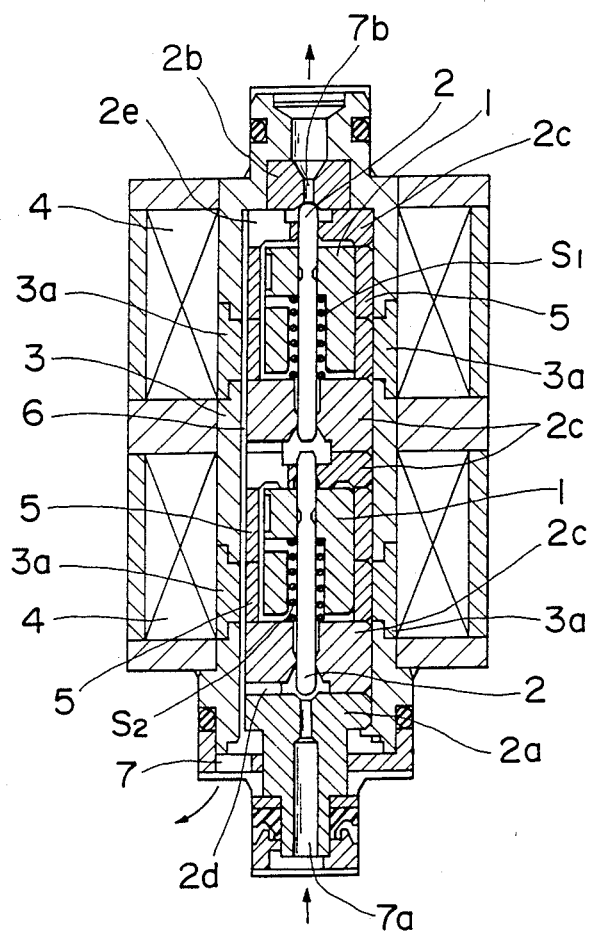

The embodiment shown in FIG. 1 has an approximately cylindrical casing 3 and solenoids 4, 4 provided around the outer periphery of this casing 3. Those portions of the casing facing the solenoids 4, 4 are partly formed as non-magnetic-material sections 3a, 3a. Sleeves 5 which serve as the cylindrical members are fitted into the casing 3.

Figure 2:
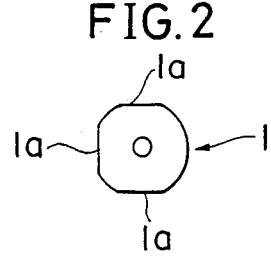
Figure 3:
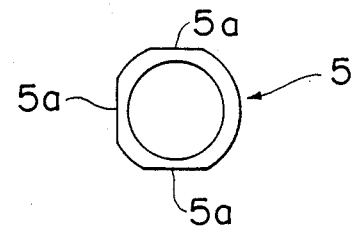
Figure 4:
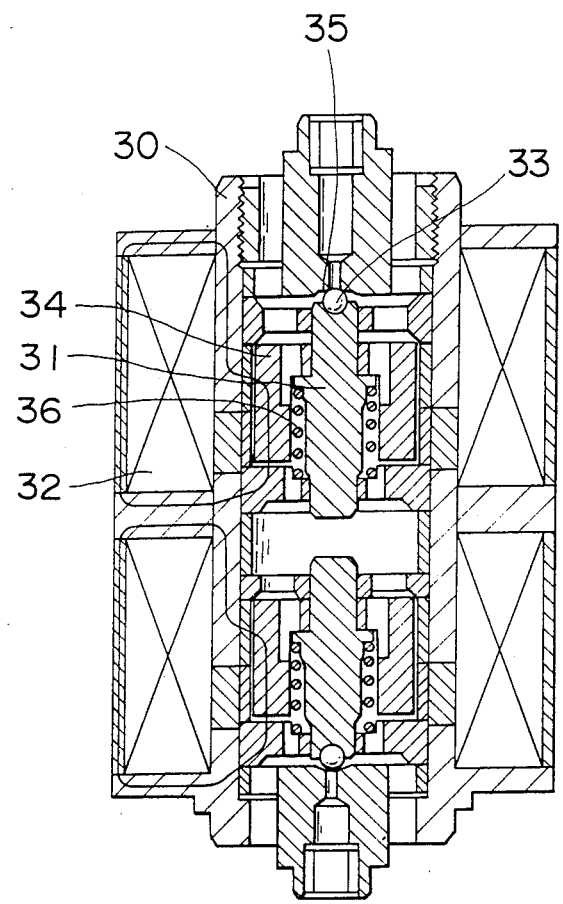
FIGS. 4 and 5 are overall sectional views of conventional electromagnetic valves.
Figure 5:
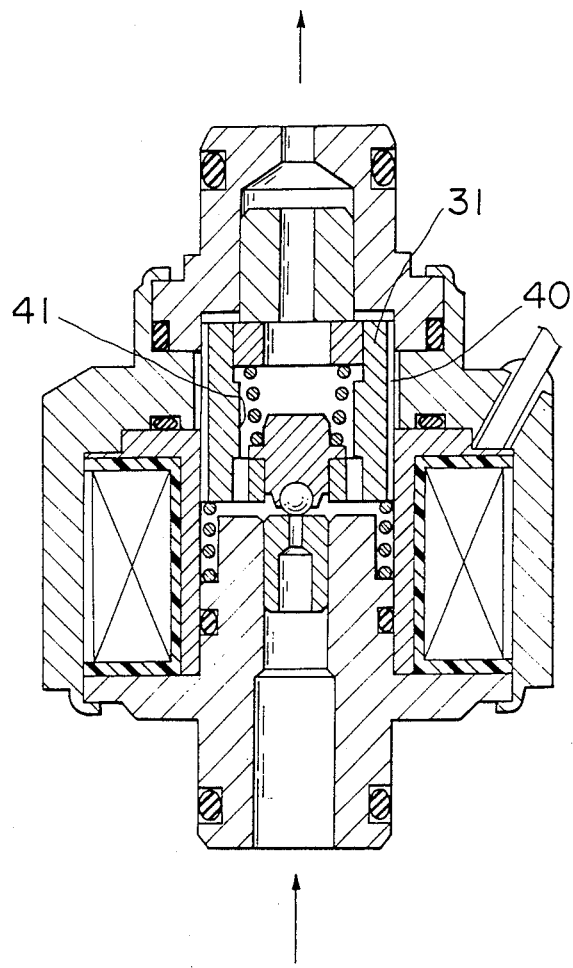

As shown in FIG. 3, a cross-sectional view of one of the sleeves 5, three cutout sections 5a, 5a, 5a are formed on the respective outer peripheral surfaces of the sleeves 5, so that, when fitted into the casing, 3, the sleeves 5 define a by-pass passage 6 between themselves and the inner peripheral surface of the casing 3. Fitted into these sleeves 5 are respective plungers 1, 1 which have, as shown in FIG. 2, three cutout sections 1a, 1a, 1a on their respective outer peripheral surfaces. Valve rods 2, 2 which serve as the valve members are fitted into the respective plungers 1, 1 and secured therein.

The respective tip ends of these valve rods 2, 2 are adapted to abut against respective valve seats 2a, 2b fixed in the top and bottom sections of the casing 3, respectively, and serve to interrupt the liquid-flow path. Cutout sections similar to those of the sleeves 5 are formed on the valve seat 2a, thereby defining a passage between the valve seat and the casing 3.

Both ends of the respective valve rods 2, 2 are slidably supported by rod-guide members 2c arranged at four positions. These rod-guide members 2c also have on their respective outer peripheral surfaces cutouts similar to those of the sleeves 5, thereby defining a flow passage between them and the casing 3. A first and a second coil spring $S_1$, $S_2$ serving as a first and a second resilient means are provided between the rod-guide members $2c$ and the plungers 1 and serve to bias the valve rods 2 in such a manner that the upper valve rod (as seen in the drawing) 2 constantly abuts against the valve seat $2b$ and that the lower valve rod 2 is constantly separated from the valve seat $2a$.

This electromagnetic valve is designed to be incorporated into a hydraulic-pressure brake device, so that it includes three liquid-flow paths: a liquid-inlet/outlet port 7 is connected to a wheel cylinder (not shown) in the brake device, a liquid path $7a$ formed in the valve seat $2a$ being connected to a brake master cylinder (not shown), and a liquid path $7b$ formed in the valve seat $2b$ being connected to a reservoir (not shown) for storing extra working liquid.

The above-mentioned by-pass passage 6 is open onto the valve rods 2 as well as onto the liquid-inlet/outlet port 7.

While in this example the by-pass passage 6 is defined between the three flat cutout sections $5a$, $5a$, $5a$ formed on the respective outer peripheral surfaces of the sleeves 5 and the inner peripheral surface of the casing 3, the number of cutout sections $5a$ may be two or four, instead of three. Alternatively, a plurality of longitudinal grooves may be formed on the respective outer peripheral surfaces of the sleeves 5 to provide a spline-like by-pass passage 6. Thus, any type of passage will do as long as it extends over the entire length of the sleeves 5.

The operation of the electromagnetic valve of this invention will now be described.

When the liquid pressure in the liquid path $7a$ on the master cylinder side is heightened, the working liquid flows along the valve rod 2 on the side of the liquid-inlet/outlet port 7 and through the passage $2d$, and is discharged to the wheel cylinder side through the liquid-inlet/outlet port 7. If, in this condition, the liquid pressure acting on the liquid-inlet/outlet port 7 exceeds a predetermined value, electricity is supplied to the solenoids 4, 4. The valve rod 2 on the side of the valve seat $2a$ is then closed, and the valve rod on the side of the valve seat $2b$ opened. This causes the working liquid to flow toward the reservoir side through the by-pass passage 6 and the passage $2e$, thereby letting out the pressure.

When the liquid pressure in the liquid path $7a$ is reduced, the working liquid is returned from the side of the liquid path $7b$ to the side of the liquid path $7a$ through the by-pass passage 6. Thus, the working liquid moves through the by-pass passage 6, so that it does not adversely affect the movement of the plunger 1.

In the above-described embodiment, flow passages are formed also on the respective outer peripheral surfaces of the plungers 1, which not only allows the back pressure to be smoothly relieved when the plungers 1 move, but also makes it possible to make the plungers 1 smaller than in prior art valves.

While the above embodiment of this invention has been described as applied to a double-valve-type electromagnetic valve, it goes without saying that this invention can also be applied to a single-valve-type electromagnetic valve. In other words, the present invention can be applied to any type of electromagnetic valve as long as its structure is such that a plunger 1 is arranged in working liquid.

What is claimed is:

1. An electromagnetic valve comprising: plungers, a casing, valve members operatively connected to said plungers and sealed in said casing, solenoids provided outside said casing and adapted to drive said plungers, a liquid-inlet/outlet port, cylindrical members arranged between said casing and said plungers, and a by-pass passage defined between the respective outer peripheral surfaces of these cylindrical members and the inner peripheral surface of said casing, said by-pass passage being open onto said valve members as well as onto said liquid-inlet/outlet port.

2. An electromagnetic valve as claimed in claim 1, wherein a pair of plungers are arranged in series in said electromagnetic valve, said valve members being integrally fixed to said pair of plungers.

3. An electromagnetic valve as claimed in claim 2, further comprising valve seats provided at the ends of each plunger, each of said valve members fixed to the respective plungers facing one of said valve seats in such a manner as to be able to abut against it.

4. An electromagnetic valve as claimed in claim 3, wherein one of said plungers is biased by a first resilient means to cause the valve member fixed to this plunger to abut against one of said valve seats, the other plunger being biased by a second resilient means to cause the valve member fixed to this plunger to be separated from one of said valve seats.

5. An electromagnetic valve as claimed in claim 1, wherein said valve members are fixed to the respective plungers in such a manner that their respective ends protrude from the plungers, said ends being slidably guided by rod-guide members.

6. An electromagnetic valve as claimed in claim 5, wherein by-pass passages similar to said by-pass passage defined between said cylindrical members and said casing are formed on said rod-guide members.

7. An electromagnetic valve as claimed in claim 1, wherein said electromagnetic valve is incorporated into part of a hydraulic-pressure brake device, and wherein said valve seats have respective liquid paths which can communicate with said by-pass passage, at least one of said liquid paths being connected to a brake master cylinder, the other being connected to a reservoir, and said liquid-inlet/outlet port being connected to a wheel cylinder in said brake device.

8. An electromagnetic valve as claimed in claim 1, wherein said by-pass passage is defined between a plurality of flat cutout sections formed on said cylindrical members and the inner peripheral surface of said casing.

9. An electromagnetic valve as claimed in claim 1, wherein said by-pass passage is defined between a plurality of longitudinal grooves formed on the outer periphery of said cylindrical members and the inner peripheral surface of said casing.

* * * * *